(12) United States Patent
Soeda

(10) Patent No.: US 8,699,094 B2
(45) Date of Patent: Apr. 15, 2014

(54) IMAGE READER AND IMAGE FORMING APPARATUS

(71) Applicant: Yoshihisa Soeda, Kanagawa (JP)

(72) Inventor: Yoshihisa Soeda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/677,603

(22) Filed: Nov. 15, 2012

(65) Prior Publication Data

US 2013/0135693 A1    May 30, 2013

(30) Foreign Application Priority Data

Nov. 28, 2011    (JP) .................................. 2011-259250

(51) Int. Cl.
*H04N 1/04* (2006.01)

(52) U.S. Cl.
USPC ............ 358/474; 358/461; 358/452; 358/497

(58) Field of Classification Search
USPC ......... 358/474, 461, 452, 496, 497, 486, 451, 358/1.9, 529
See application file for complete search history.

(56) References Cited

U.S. PATENT DOCUMENTS

| | | | | |
|---|---|---|---|---|
| 6,995,877 B2 * | 2/2006 | Suzuki | ........................... | 358/474 |
| 7,006,260 B2 * | 2/2006 | Sato et al. | ..................... | 358/448 |
| 7,058,215 B2 * | 6/2006 | Ikeda et al. | ................... | 382/135 |
| 7,436,737 B2 * | 10/2008 | Fukuda et al. | .................. | 368/28 |
| 7,681,981 B2 * | 3/2010 | Hoshi | .............................. | 347/22 |
| 7,782,498 B2 * | 8/2010 | Hoshi | ............................ | 358/474 |
| 8,345,327 B2 * | 1/2013 | Mikami | ........................ | 358/475 |
| 2002/0048470 A1 | 4/2002 | Kanno | | |
| 2006/0028903 A1 | 2/2006 | Hada | | |
| 2008/0294921 A1 | 11/2008 | Hada | | |

FOREIGN PATENT DOCUMENTS

| | | |
|---|---|---|
| JP | 2002-077520 | 3/2002 |
| JP | 2002-112027 | 4/2002 |
| JP | 2002-118726 | 4/2002 |
| JP | 2004-109639 | 4/2004 |
| JP | 2006-074747 | 3/2006 |
| JP | 2006-262044 | 9/2006 |
| JP | 2008-067189 | 3/2008 |
| JP | 2008-072375 | 3/2008 |
| JP | 2010-206491 | 9/2010 |
| JP | 2011-193368 | 9/2011 |
| JP | 2011-244057 | 12/2011 |

* cited by examiner

*Primary Examiner* — Negussie Worku
(74) *Attorney, Agent, or Firm* — Oblon, Spivak, McClelland, Maier & Neustadt, L.L.P.

(57) ABSTRACT

An image reader capable of entering a power save mode for saving power consumption during standby includes: a gain amplifier; a reference white plate that is to be scanned when gain control of the gain amplifier is performed to obtain a controlled gain value; a carriage that moves to an stops at an area corresponding to the reference white plate when the image reader enters the power save mode; a gain storage section that stores the controlled gain value as a recovery parameter when the image reader enters the power save mode; and a gain setting section that sets the recovery parameter as the controlled gain value when the image reader exits the power save mode.

5 Claims, 11 Drawing Sheets

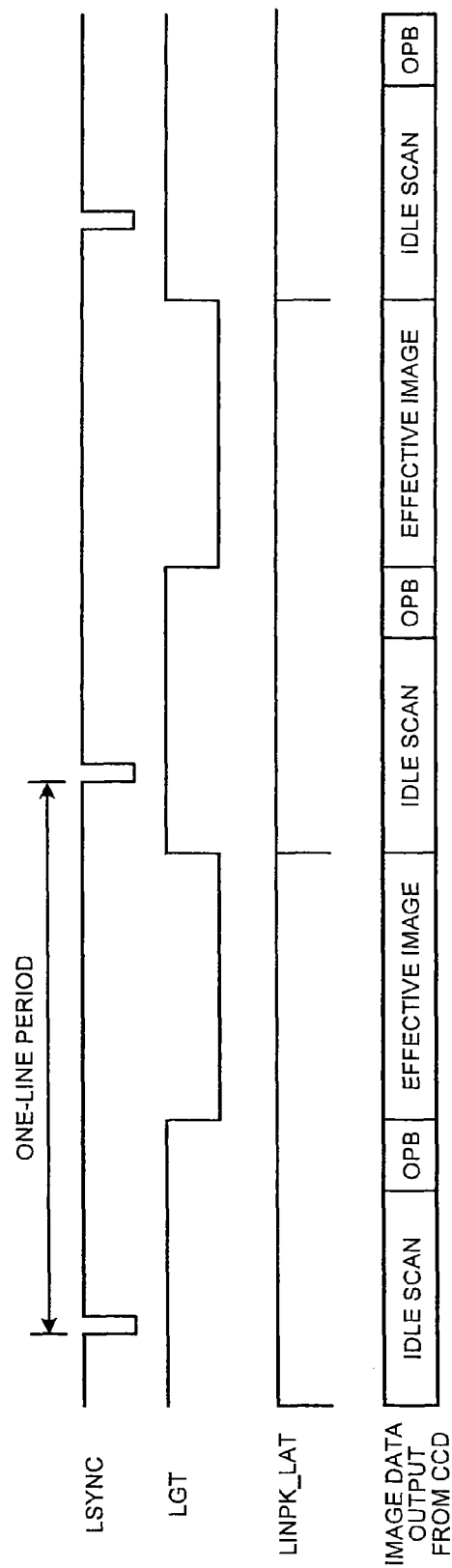

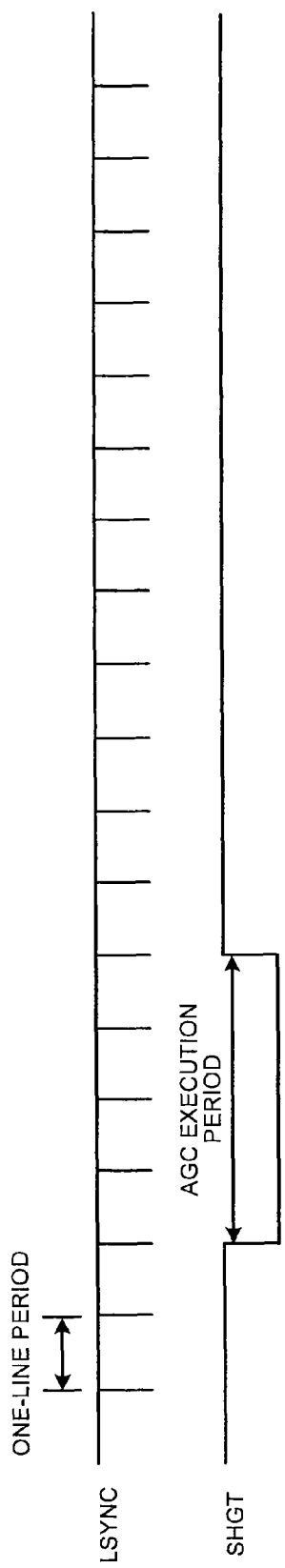

IMAGE READER AND IMAGE FORMING APPARATUS

CROSS-REFERENCE TO RELATED APPLICATIONS

The present application claims priority to and incorporates by reference the entire contents of Japanese Patent Application No. 2011-259250 filed in Japan on Nov. 28, 2011.

BACKGROUND OF THE INVENTION

1. Field of the Invention

The present invention relates to an image reader and an image forming apparatus for use in a digital copier, a scanner, a facsimile, or the like.

2. Description of the Related Art

Under recent conditions where importance is placed on environmental protection and energy conservation, efforts are continuously made to design copiers, multifunction peripherals (MFPs), and the like to meet criteria of Energy Star (registered trademark), ZESM, or the like that are proposed with the aim of saving energy. These criteria are designed to save energy and set a limit on energy consumption of equipment in a standby state (a state into which the equipment is put when the equipment remains unused for a predetermined period of time after power-on of a main power supply, and in which power supply to a portion of the equipment is stopped and the equipment waits for a return instruction).

In a conventional power save mode in a standby state employed by a typical copier or MFP, power supply to large-power-consuming components such as a fixing heater and an operation panel are switched off or switched to low-power operation, and power supply to a scanner is entirely switched off.

When the copier or the MFP that is in the standby state is used, a user needs to wait until power supply is turned on so that the copier or the MFP return from a low-power operation state to a normal operation state to bring the copier or the MFP to a state where the copier or the MFP can be used. This waiting time is felt by the user to be longer than its actual length, and stresses the user.

More specifically, at a time of returning from the standby state, a scanner section performs the following adjustment, or control when power supply is switched on so that an obtained analog image signal is converted into a digital image signal accurately.

Adjustment of an amplification factor to increase the analog image signal to an appropriate level Adjustment of a reference level for optimization of a black level Accordingly, in a case where power supply to a scanner section is to be stopped in the standby state, a conventional process of returning from the standby state disadvantageously requires time to perform the adjustment or control described above, causing the user to wait longer.

Under these circumstances, there have conventionally been proposed techniques including a technique of reducing time required to perform the adjustment or control operations described above by not performing initialization of a traveling member (detection of a home position of the traveling member) that would otherwise be performed before gain control (Japanese Patent Application Laid-open No. 2002-118726) and a technique of reducing time required to perform the adjustment or control described above by using a value having been stored before entering the power save mode, as an initial control value of the adjustment or control described above (Japanese Patent Application Laid-open No. 2002-112027 and Japanese Patent Application Laid-open No. 2002-077520).

However, in recent years, in addition to reduction in return time achieved by techniques as disclosed in Japanese Patent Application Laid-open No. 2002-118726, 2002-112027, or 2002-077520, further reduction in return time is necessitated.

There is a need to further reduce waiting time until it becomes possible to perform scan from when being in a power save mode while suppressing an increase in cost.

SUMMARY OF THE INVENTION

It is an object of the present invention to at least partially solve the problems in the conventional technology.

An image reader includes: a gain amplifier; a reference white plate that is to be scanned when gain control of the gain amplifier is performed; a traveling member that moves to and stops at an area corresponding to the reference white plate at a time of entering a power save mode to save power consumption during standby; a gain storage unit that stores a gain control value after gain control as a return parameter at a time of entering the power save mode; a gain setting unit that sets the return parameter as a gain control value of the gain amplifier at a time of returning from the power save mode; an initializing unit that, after the gain setting unit has set the return parameter, performs a process of moving the traveling member from the area corresponding to the reference white plate to a home position of the traveling member, and simultaneously acquires a reference white level pertaining to the reference white plate and determines whether the reference white level falls within a normal range; and a gain-newly-setting unit that, when the reference white level is determined to fall outside the normal range, moves the traveling member to the area corresponding to the reference white plate and newly performs gain control of the gain amplifier.

An image forming apparatus includes an image reader as described above.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a timing diagram of a synchronization signal in a main-scanning direction and an effective area in scan data at a time of image scanning according to the second embodiment; and FIG. 11 is a timing diagram in a sub-scanning direction according to the second embodiment.

DETAILED DESCRIPTION OF THE PREFERRED EMBODIMENTS

First Embodiment

A first embodiment of the present invention is described with reference to FIG. 1. The present embodiment is an example that is applied to, as an image forming apparatus, a digital MFP, generally referred to as an MFP, that integrally has a copier function, a facsimile (FAX) function, a printer function, a scanner function, and a function of delivering an input image (an image obtained by scanning a document using the scanner function or an image that is input to the image forming apparatus using the printer function or the FAX function).

Figure 1:
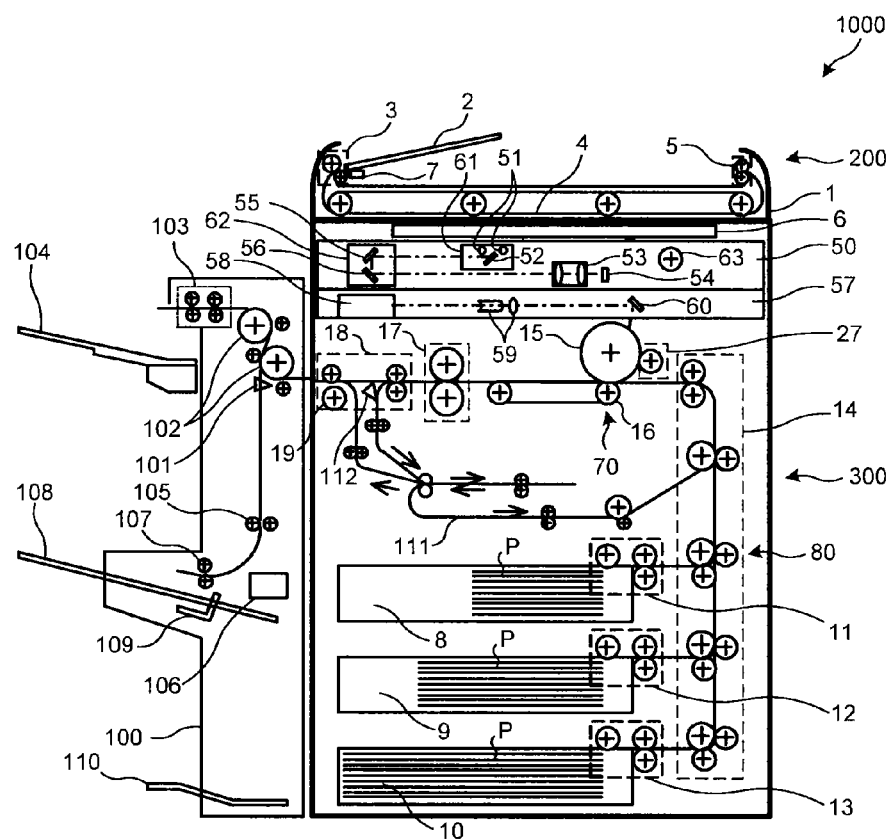
FIG. 1 is a configuration diagram schematically illustrating a digital MFP according to a first embodiment of the present invention.

FIG. 1 is a configuration diagram schematically illustrating a digital MFP 1000 according to the first embodiment of the present invention. The digital MFP 1000 according to the present embodiment includes a finisher 100 which is a post-processing apparatus, a scanner section 200 which is an image reader, and a printer section 300 which is an image printing apparatus.

The scanner section 200 of the digital MFP 1000 is described below first. The scanner section 200 principally includes an auto document feeder (ADF) 1 and a scanning unit 50.

When a print key (not shown) on an operating section 400 (see FIG. 2) is pressed, sheets of a document stack placed on a document tray 2 of the ADF 1 with image sides facing upward are fed one sheet by one sheet from lowermost one of the sheets to a predetermined position on an exposure glass 6 by a feeding roller 3 and a feeding belt 4. The digital MFP 1000 has a counting function of incrementing a count of number of document sheets each time feed of one document sheet to the predetermined position on the exposure glass 6 is completed.

The scanning unit 50 scans a document fed to the predetermined position on the exposure glass 6, thereby obtaining image data.

The scanning unit 50 is described in detail below. The scanning unit 50 includes the exposure glass 6 where a document is to be placed and a scanning optical system. The scanning optical system includes an exposure lamp 51 which is a lighting unit, a first mirror 52, a lens 53, a charge coupled device (CCD) image sensor 54. The exposure lamp 51 and the first mirror 52 are fixed onto a first carriage 61. A second mirror 55 and a third mirror 56 are fixed onto a second carriage 62. This optical scanning system is driven by a scanner driving motor 63. The scanning unit 50 according to the present embodiment can perform scanning using selected one of a scanning method of switching on the exposure lamp 51 when a document is placed on the exposure glass 6 and capturing an image of the document by causing the scanner driving motor 63 to move the first carriage 61, corresponding to a traveling member, and the second carriage 62 rightward so as to perform scanning, and a scanning method of capturing an image of a document that is conveyed by the ADF 1 in a state where the exposure lamp 51 is kept lit and the first carriage 61 and the second carriage 62 remain at rest. In the scanning method that captures a document image by causing the scanner driving motor 63 to move the first carriage 61 and the second carriage 62 rightward so as to perform scanning, the first carriage 61 and the second carriage 62 are mechanically moved in a sub-scanning direction so that a velocity of the first carriage 61 to a velocity of the second carriage 62 is two to one so as to keep an optical path length constant. The CCD image sensor 54 captures a document image, converts it into an electric signal, and outputs the electric signal. The output signal from the CCD image sensor 54 is converted by an analog-to-digital (A/D) converter into digital data (image data).

Document image data converted into digital data is put to diverse uses as information fed from the scanner section 200. For example, the image data is transmitted to the printer section 300 to be output as a printout, or transmitted to a storage device to be stored therein as input image data.

A document having undergone scanning to obtain image data performed by the scanning unit 50 is discharged by the feeding belt 4 and discharging rollers 5.

When a document set detector 7 detects that a subsequent document is on the document tray 2, the subsequent document is fed onto the exposure glass 6 as in a case of the previous document.

Each of the feeding roller 3, the feeding belt 4, and the discharging rollers 5 is driven by a conveying motor (not shown).

The printer section 300 of the digital MFP 1000 is described below. The printer section 300 principally includes an image forming station 70, a fixing unit 17, a paper feed section 80, and a duplex-printing paper-feed unit 111.

The image forming station 70 forms an image with an electrophotographic method. The image forming station 70 primarily includes a writing unit 57, a photosensitive element 15, a developing unit 27, and a conveying belt 16 that also functions as a transfer section.

The paper feed section 80 includes a first tray 8, a second tray 9, a third tray 10, a first paper feed device 11, a second paper feed device 12, a third paper feed device 13, and a vertical feed unit 14. Transfer paper P loaded on the first tray 8, the second tray 9, or the third tray 10 is delivered by corresponding one of the first paper feed device 11, the second paper feed device 12, and the third paper feed device 13 to the vertical feed unit 14 and conveyed by the vertical feed unit 14 to a position where the transfer paper P abuts on the photosensitive element 15.

Image data obtained by scanning by the scanning unit 50 is written to the photosensitive element 15 with a laser beam emitted from the writing unit 57, and developed into a toner image while passing through the developing unit 27. The writing unit 57 includes a laser emitting unit 58, imaging lenses 59, and a mirror 60. The laser emitting unit 58 internally includes a laser diode, which is a laser light source, and a polygon mirror rotated by a motor at a fixed high velocity. Although not illustrated, a beam sensor that generates a main-scanning synchronization signal is arranged at a position illuminated with a laser beam and near an end of the photosensitive element 15.

A toner image on the photosensitive element 15 is transferred onto transfer paper P conveyed by the conveying belt 16 at the same velocity as a rotation velocity of the photosensitive element 15. Thereafter, the transfer paper P is conveyed to the fixing unit 17 where the image is fixed onto the transfer paper P, and then discharged by a discharging unit 18 to the finisher 100 which is the postprocessing apparatus.

The finisher 100 which is the postprocessing apparatus is operable to guide the transfer paper P, conveyed to the finisher 100 by discharging rollers 19 of the discharging unit 18, to selected one of a direction toward normal discharging rollers 102 and a direction toward a stapling section. More specifically, the finisher 100 which is the postprocessing apparatus can discharge the transfer paper P to a normal discharge tray 104 via conveying rollers 103 by switching a switching plate 101 so as to point upward. The finisher 100 can discharge the transfer paper P onto a stapling tray 108 via conveying rollers 105 and 107 by switching the switching plate 101 so as to point downward.

The transfer paper P stacked on the stapling tray 108 is aligned at its edge by a paper-aligning jogger 109 each time a sheet of the transfer paper P is discharged. When discharge of a single set of printouts is completed, the set of printouts is stapled by a stapler 106. The set of sheets of the transfer paper P stapled by the stapler 106 is housed in a stapled-output discharge tray 110 by the pull of gravity.

Meanwhile, the normal discharge tray 104 of the finisher 100 is a discharge tray that is movable forward and backward. The discharge tray 104 that is movable forward and backward moves forward or backward for each set of printouts that are sorted on a per-document basis or based on an image memory, thereby separating the discharged printouts from one set to another as a simplified manner.

The digital MFP 1000 according to the first embodiment is capable of forming images on both sides of the transfer paper P. When images are to be formed on both sides of the transfer paper P, a branching member 112 to switch a conveyance path is set to point upward so that transfer paper P fed from one of the paper feed trays 8 to 10 and on which an image is formed is not guided to the discharge tray 104 but temporarily stocked on the duplex-printing paper-feed unit 111 of the discharging unit 18. Thereafter, the transfer paper P stocked on the duplex-printing paper-feed unit 111 is fed from the duplex-printing paper-feed unit 111 in a state of being turned upside down so that a toner image formed on the photosensitive element 15 is transferred onto the transfer paper P for a second time, and guided onto the discharge tray 104 via the branching member 112 set to point downward. In this manner, the duplex-printing paper-feed unit 111 is used when images are to be formed on both sides of the transfer paper P. It is also possible to turn the transfer paper P upside down using the duplex-printing paper-feed unit 111 when printing is to be performed on one side of the transfer paper P on the other side of which an image has already been formed.

The photosensitive element 15, the conveying belt 16, the fixing unit 17, the discharging unit 18, the developing unit 27, and the finisher 100 are driven by a main motor (not shown). Driving force of the main motor is transmitted to the paper feed devices 11 to 13 via respective paper feed clutches (not shown). The vertical feed unit 14 is driven by transmitting driving force of the main motor to the vertical feed unit 14 via an intermediate clutch (not shown).

Figure 2:
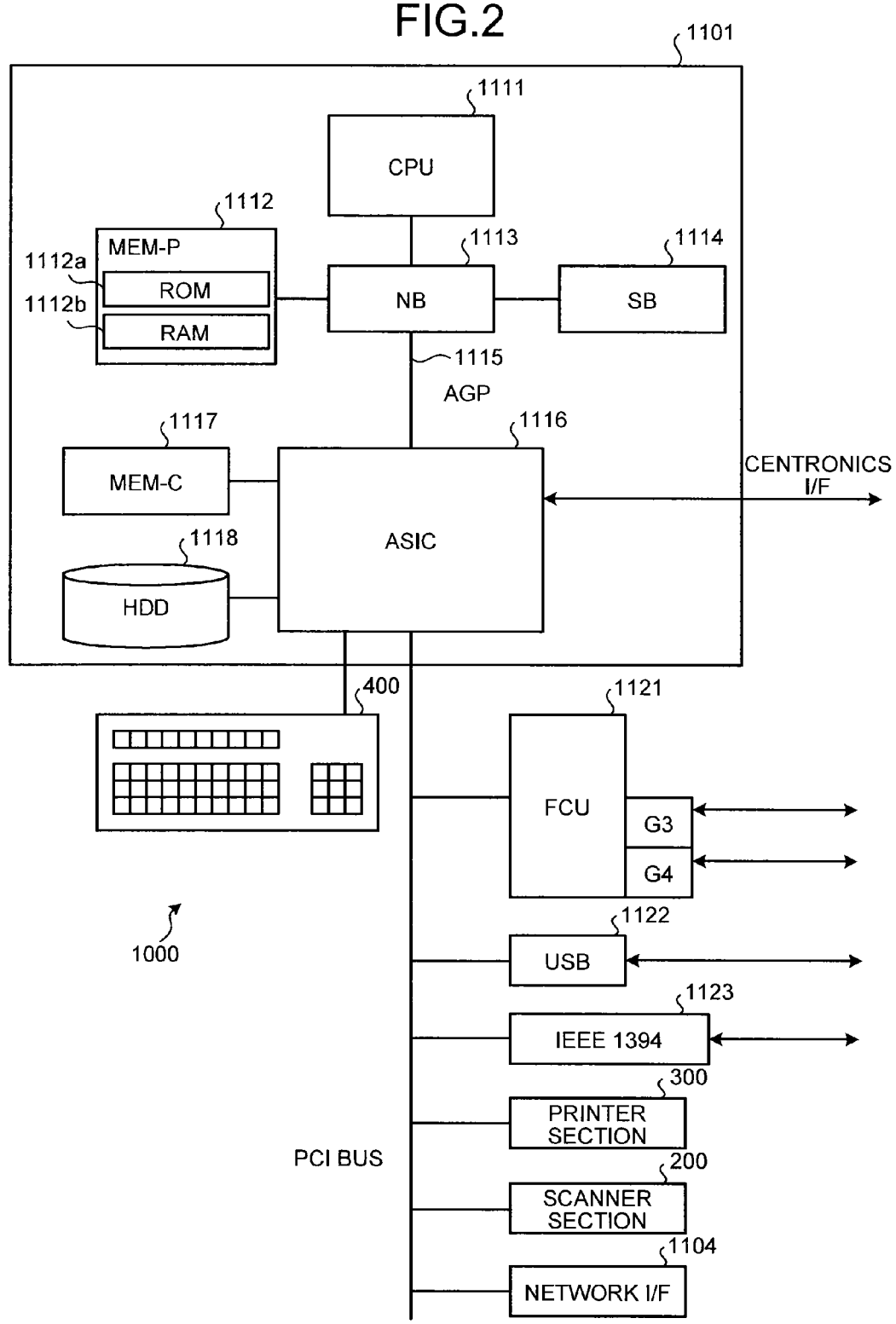
FIG. 2 is a block diagram illustrating a hardware configuration of the digital MFP according to the first embodiment.

FIG. 2 is a block diagram illustrating a hardware configuration of the digital MFP 1000. As illustrated in FIG. 2, the digital MFP 1000 includes a controller 1101, the printer section 300, and the scanner section 200 connected to one another via a peripheral component interconnect (PCI) bus. The controller 1101 is a controller that performs control of the whole digital MFP 1000, and control of image drawing, communication, and input from the operating section 400. The printer section 300 or the scanner section 200 includes an image processing section that performs image processing such as error diffusion and gamma conversion.

The controller 1101 includes a central processing unit (CPU) 1111 which is a primary part of a computer, a system memory (MEM-P) 1112, a north bridge (NB) 1113, a south bridge (SB) 1114, an application-specific integrated circuit (ASIC) 1116, a local memory (MEM-C) 1117, and a hard disk drive (HDD) 1118. The NB 1113 and the ASIC 1116 are connected with each other via an accelerated graphics port (AGP) bus 1115. The MEM-P 1112 includes a read only memory (ROM) 1112a and a random access memory (RAM) 1112b.

The CPU 1111 controls the whole digital MFP 1000 and a chip set made up of the NB 1113, the MEM-P 1112, and the SB 1114 is provided. The CPU 1111 is connected to other equipment via the chip set.

The NB 1113 is a bridge that connects the CPU 1111 to the MEM-P 1112, the SB 1114, and the AGP bus 1115. The NB 1113 includes a PCI master, an AGP target, and a memory controller that controls reading and writing from and to the MEM-P 1112.

The MEM-P 1112 is a system memory for use as a memory to store a program and data, a memory to deploy a program and data therein, and a memory for image drawing of a printer, and includes the ROM 1112a and the RAM 1112b. The ROM 1112a is a read only memory to store a program and data to control operation of the CPU 1111. The RAM 1112b is a writable and readable memory used as the memory to deploy a program and data therein, the memory for image rendering of a printer, and the like.

The SB 1114 is a bridge to connect the NB 1113 to a PCI device and a peripheral device. The SB 1114 is connected to the NB 1113 via the PCI bus, to which a network interface (I/F) 1104 and the like are also connected.

The ASIC 1116 is an integrated circuit (IC) for image processing that includes a hardware component for use in the image processing. The ASIC 1116 functions as a bridge that connects the AGP bus 1115, the PCI bus, the HDD 1118, and the MEM-C 1117 to one another. The ASIC 1116 includes a PCI target and an AGP master, an arbiter (ARB), a memory controller, a plurality of direct memory access controllers (DMAC), and a PCI unit. The ARB is a core of the ASIC 1116. The memory controller controls the MEM-C 1117. The DMACs performs rotation of image data or the like by hardware logic or the like. The PCI unit transfers data between the printer section 300 and the scanner section 200 via the PCI bus. A FAX control unit (FCU) 1121, a universal serial bus (USB) 1122, and an IEEE 1394 (the Institute of Electrical and Electronics Engineers 1394) interface 1123 are connected to the ASIC 1116 via the PCI bus.

The MEM-C 1117 is a local memory used as a buffer for an image to be copied and as a code buffer. The HDD 1118 is storage to store image data, a program to control operation of the CPU 1111, font data, and a form.

The AGP bus 1115 is a bus interface for a graphics accelerator card introduced to speed up graphics operation and allows speed up operation of the graphic accelerator card by direct accessing to the MEM-P 1112 with a high throughput.

A function of a power save mode to reduce power consumption during standby implemented according to a program by the controller 1101 of the digital MFP 1000 according to the first embodiment is now briefly described. In the power save mode implemented by the digital MFP 1000 during a standby state, a power supply of a large-power-consuming element such as a fixing heater of the fixing unit 17 and the operating section 400 (see FIG. 2) is switched off or switched to low-power operation, and a power supply to the scanner section 200 is entirely switched off. More specifically, the digital MFP 1000 has three types of power save modes given below.

Low-power mode: when a predetermined period of time has elapsed from when the digital MFP 1000 used last, power supply to the digital MFP 1000 except for a part of an engine-related load is stopped, and a fixing temperature is lowered.

Sleep mode: when the digital MFP 1000 remains unoperated after entry into the low-power mode, power supply to the engine-related load is stopped.

Power-off mode: when the digital MFP 1000 remains unused for a set period of time or longer, power supply to the entire engine-related load is stopped, and power supply to a controller-related load except for a part thereof is stopped.

The sleep mode is enabled when the digital MFP 1000 has a printer function or a scanner function by adding an option. The power-off mode is enabled when the digital MFP 1000 has only a copier function. Thus, only either one of the sleep mode and the power-off mode is enabled depending on what function the digital MFP 1000 has. In short, the sleep mode and the power-off mode are mutually exclusive.

At a time of returning from the standby state by the power save mode described above, the scanner section 200 performs the following adjustment or control when a power supply is switched on, so that an obtained analog image signal is converted into a digital image signal accurately.

Adjustment of an amplification factor to increase an analog image signal to an appropriate level Adjustment of a reference level for optimization of a black level Accordingly, in a case where power supply to the scanner section 200 is stopped in the standby state, return from the standby state requires time to perform the adjustment or control described above. Therefore, there is a need to reduce waiting time from when the power supply is switched on until when the scanner section 200 becomes ready to perform document scanning.

Functions the digital MFP 1000 has are described below.

Figure 3:
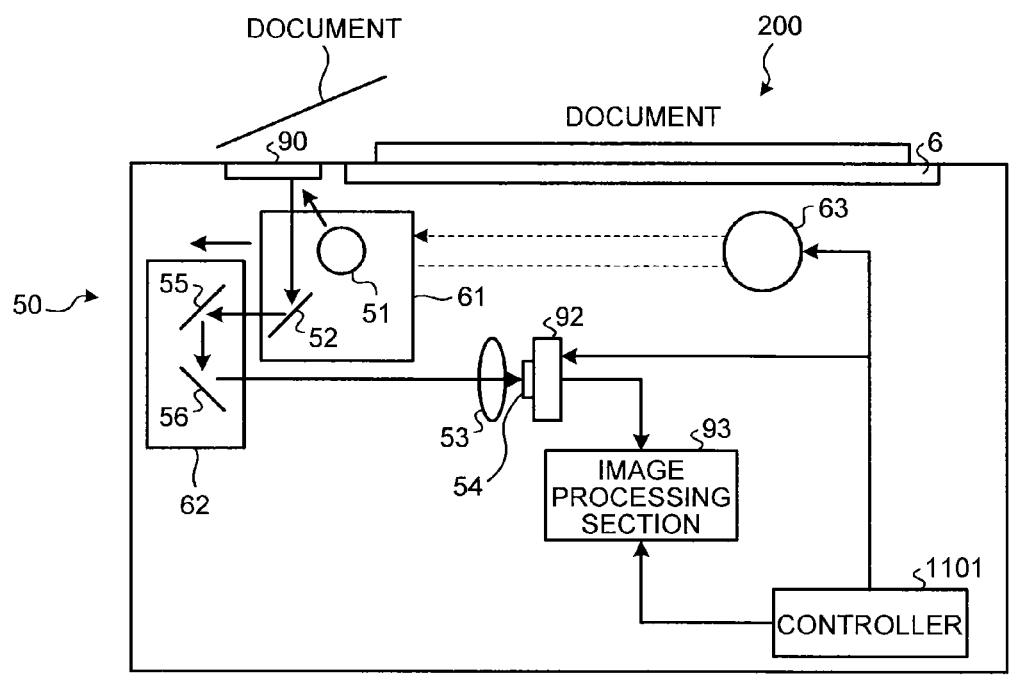
FIG. 3 is a schematic configuration diagram illustrating a scanning unit of a scanner section according to the first embodiment.

FIG. 3 is a schematic configuration diagram illustrating the scanning unit 50 of the scanner section 200. In addition to a configuration described above, a reference white plate 90 is arranged above the scanning unit 50 and upstream of the exposure glass 6 in the sub-scanning direction. The reference white plate 90 is a member that is practically white, uniform in density, and laid along a main scanning direction. During a period when a power supply is on, the reference white plate 90 is to be scanned for gain control of a gain amplifier that amplifies an image signal. During document scanning, the reference white plate 90 is to be scanned to obtain shading correction data.

In the digital MFP 1000 according to the present embodiment, shading correction data is generated by scanning the reference white plate 90 to obtain scan data and is stored in a memory prior to document scanning. During scanning an image of a document, normalization is performed with reference to the shading correction data, thereby correcting uneven luminous-energy distribution, uneven sensitivity of the CCD, fluctuation in output power, and the like of the digital MFP 1000 to accurately obtain image data of the document by scanning.

The CCD image sensor 54 is mounted on a CCD board 92. The CCD board 92 includes a signal processing IC 91 (see FIG. 4). The CCD board 92 outputs voltage that depends on luminous energy of incident light and passes the voltage as image data to an image processing section 93.

As described above, the scanner section 200 is controlled by the controller 1101. The CCD board 92 and the image processing section 93 are also controlled by the controller 1101.

Figure 4:
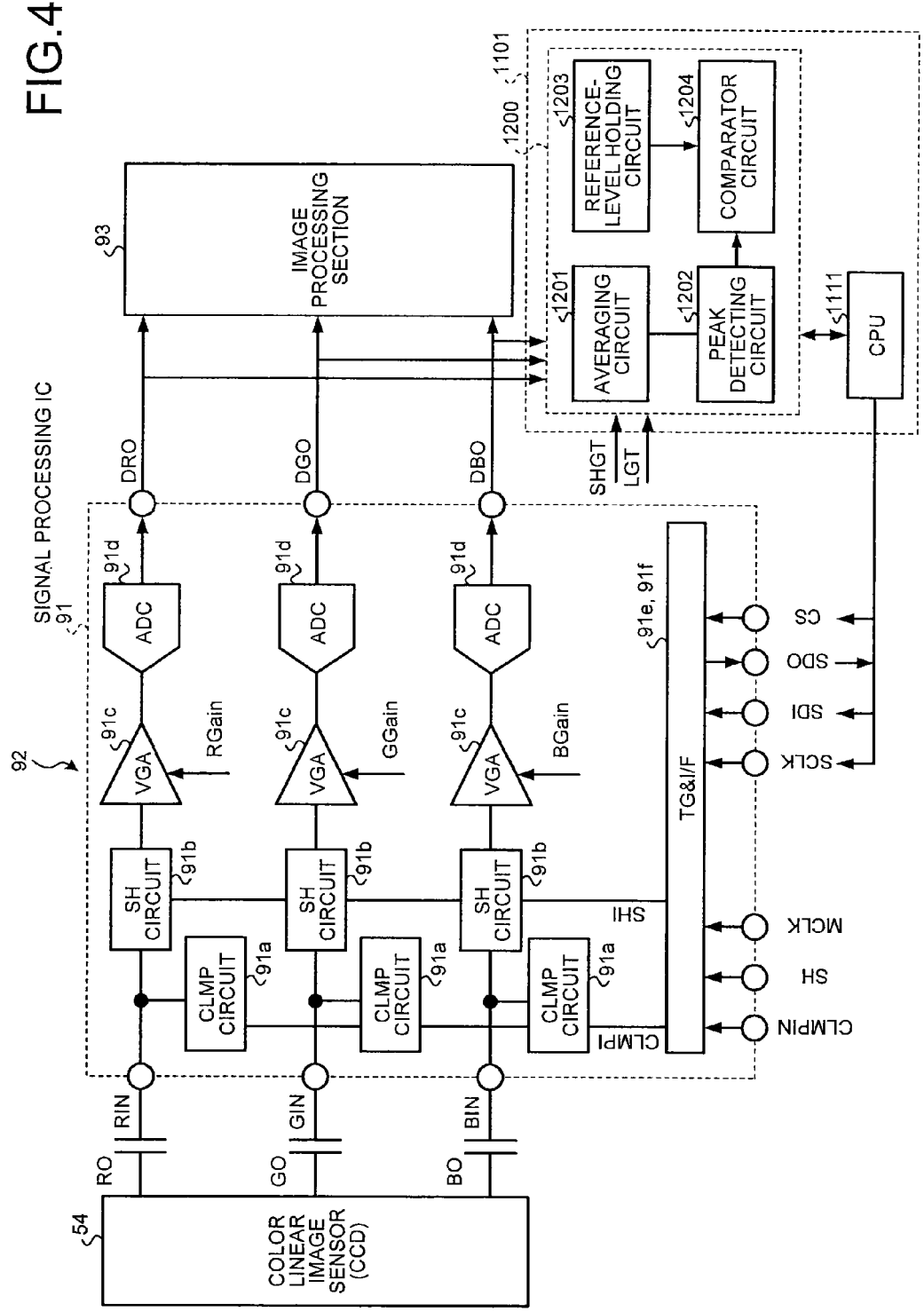
FIG. 4 is a block diagram illustrating a control system of the scanner section according to the first embodiment.

FIG. 4 is a block diagram illustrating a control system of the scanner section 200. As illustrated in FIG. 4, the controller 1101 controls the signal processing IC 91. The controller 1101 also includes a detector 1200 that has a peak detecting function for the reference white plate 90 for use in gain control and a function of detecting a rise in illumination of the exposure lamp 51. The detector 1200 includes an averaging circuit 1201, a peak detecting circuit 1202, a reference-level holding circuit 1203, and a comparator circuit 1204. The averaging circuit 1201 averages levels of signals obtained by scanning the reference white plate 90 for noise removal. The peak detecting circuit 1202 detects peak data from levels of signals obtained by scanning the reference white plate 90. The reference-level holding circuit 1203 holds a reference level. The comparator circuit 1204 compares the peak data detected by the peak detecting circuit 1202 with the reference level held by the reference-level holding circuit 1203.

As illustrated in FIG. 4, the signal processing IC 91 processes scanned image signals fed from the CCD image sensor 54. More specifically, the signal processing IC 91 performs processing until the scanned image signals are processed by respective analog processing circuits for R, G, and B, thereafter subjected to analog-to-digital conversion, and output as scan data to the image processing section 93. A procedure of the signal processing in the signal processing IC 91 is described below. Output signals of the CCD image sensor 54 are alternating-current (AC) coupled, then line clamped by clamping (CLMP) circuits 91*a*, and thereafter held by sample-and-hold (SH) circuits 91*b*. The held signals are amplified by variable gain amplifiers (VGA) 91*c* each being capable of adjusting a gain and then input to analog-to-digital (A/D) converters 91*d*. The converted digital image data is input to the image processing section 93 as scanned-image data. The signal processing IC 91 includes a timing generator 91*e* and a CPU_I/F 91*f* as components for generating generate control signals for use in performing the signal processing procedure described above. The timing generator 91*e* generates a timing signal for driving of the CCD image sensor 54 and the signal processing IC 91. The CPU_I/F 91*f* directly exchanges data with the CPU 1111.

When a main power supply of the digital MFP 1000 is switched on or when the digital MFP 1000 returns from the power save mode, a process of performing gain control of CCD output so that a level of a signal obtained by scanning the reference white plate 90 becomes equal to a predetermined level is performed in order to make it possible to effectively use dynamic ranges of the A/D converters (ADC) 91*d*. Gain control of CCD output is performed by sampling CCD output and then amplifying an obtained analog signal by the variable gain amplifiers (VGAs) 91*c*. When the converters have sufficiently high resolution, gain control of CCD output may be performed by digital amplification after performing A/D conversion. Gain control of CCD output may be performed by combination of analog amplification and digital amplification.

Typical process steps from power-on of the main power supply or return from the power save mode to the gain control are as follows. First, an initialization process (home position detection) of the first carriage and the second carriage is performed, and the exposure lamp 51 is switched on and the first carriage and the second carriage are moved to respective areas corresponding to the reference white plate 90. Thereafter, gain control is performed. After completion of the gain control, the first carriage and the second carriage are moved to their home positions, and entry to a standby state ready to perform document image scanning is made.

In contrast to the typical process steps for gain control described above, the following process steps are performed in the present embodiment in order to return from the power save mode more quickly. That is, when entering the power save mode, the exposure lamp 51 is switched on and the first carriage and the second carriage are moved to the respective areas corresponding to the reference white plate 90, and thereafter gain control is performed. The gain control values obtained at this time are stored as return parameters RP in a nonvolatile memory. This memory corresponds to a gain storage unit.

When returning from the power save mode, the exposure lamp 51 is switched on and thereafter gain control is performed with setting the return parameters PR as gain control values. Simultaneously with this control operation, a homing operation of moving the first carriage and the second carriage to their home positions is performed.

Figure 5:
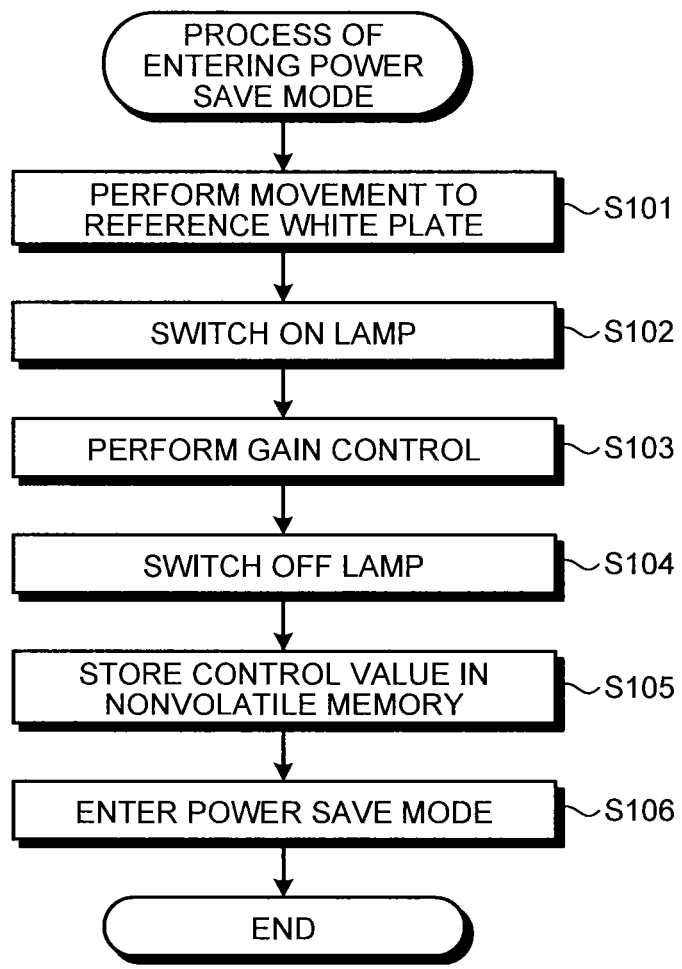
FIG. 5 is a flowchart of a process of the scanner section according to the first embodiment to be performed at a time of entering a power save mode.

FIG. 5 is a flowchart of a process of the scanner section 200 to be performed at a time of entering the power save mode. As described above, when a predetermined condition is satisfied, entry to the power save mode is made and the process is started. The predetermined condition is that, for example, no operation is made for a predetermined period of time. When the process is started, the controller 1101 issues an instruction to move the first carriage 61 and the second carriage 62 to the respective areas corresponding to the reference white plate 90 (Step S101). In contrast to a conventional scanner section that enters the power save mode in this state, the following steps are performed subsequently to this in the present embodiment.

The controller 1101 performs a process of switching on the exposure lamp 51 (Step S102). Subsequently, the controller 1101 performs gain control (Step S103). After the gain control, the controller 1101 performs a process of switching off the exposure lamp 51 (Step S104). Meanwhile, offset adjustment, luminous-energy adjustment, and/or the like may be performed at this time. The controller 1101 then stores gain control values after the gain control as the return parameters RP in the nonvolatile memory (Step S105). Subsequently, entry to the power save mode is performed (Step S106).

Figure 6:
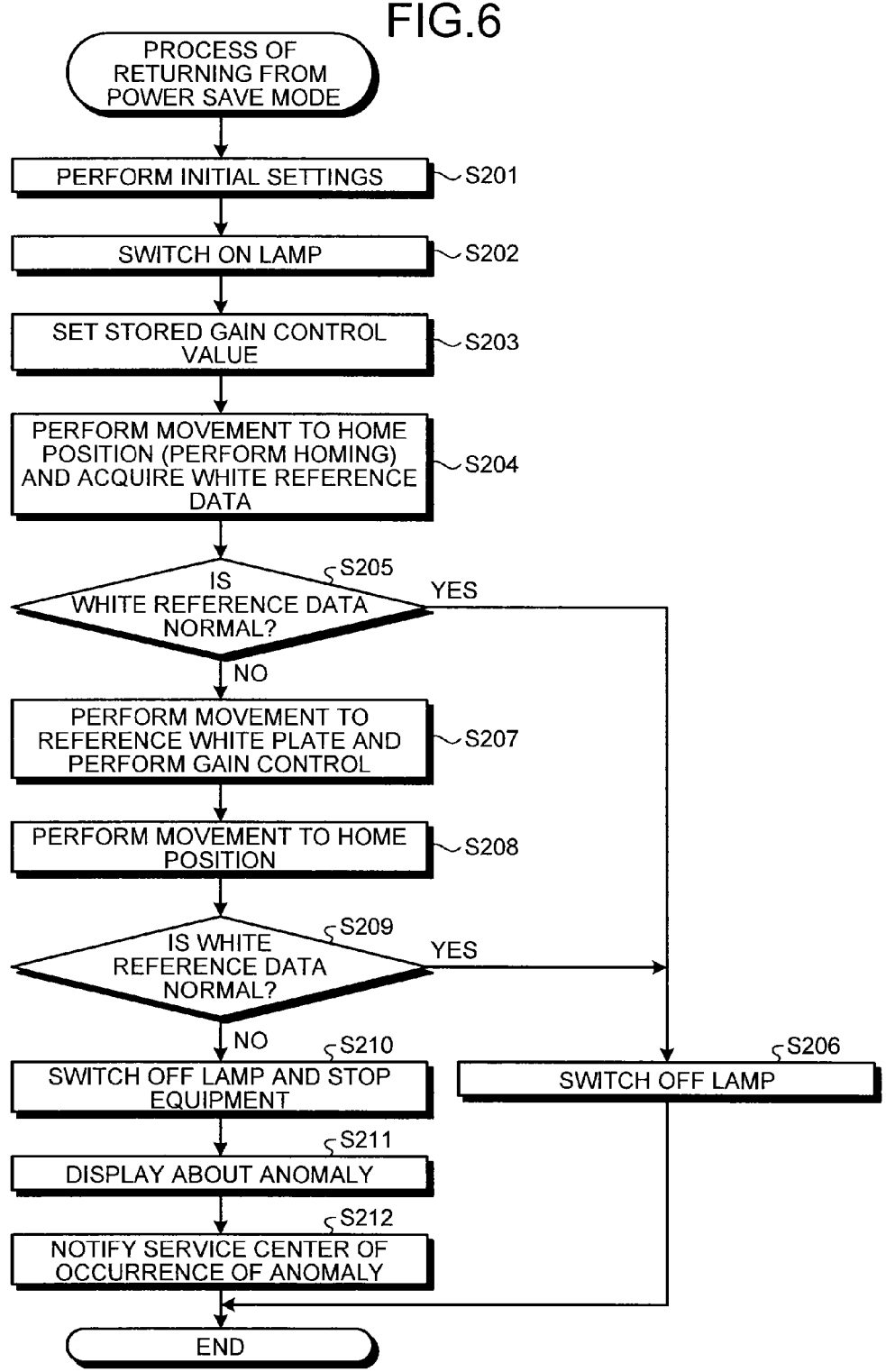
FIG. 6 is a flowchart of a return process of the scanner section according to the first embodiment to be performed at a time of returning from the power-saving mode.

A procedure of a process to be performed at a time of returning from the power save mode is described below. FIG. 6 is a flowchart of a return process of the scanner section 200 to be performed at a time of returning from the power save mode. Here, the first carriage 61 and the second carriage 62 remains in a state of having been moved to and stopped in the respective areas corresponding to the reference white plate 90 at a time of entering the power save mode. Meanwhile, at a time of returning to a normal operation mode, return process is triggered by setting of a document or the like.

When the return process is started, the controller 1101 performs initial settings necessary for the signal processing IC 91 and the like (Step S201), and performs a process of switching on the exposure lamp 51 (Step S202).

Subsequently, the controller 1101 sets the stored return parameters RP as gain control values (Step S203: corresponding to a gain setting unit). When the controller 1101 finishes setting the gain control values, the controller 1101 issues a homing instruction to move the first carriage 61 and the second carriage 62 to their home positions and, simultaneously therewith, issues an instruction for acquisition of white reference data pertaining to the reference white plate 90 (Step S204: corresponding to an initializing unit). The white reference data is acquired by scanning the reference white plate 90 using the CCD image sensor 54 and performing analog-to-digital conversion using the A/D converters 91d in the image processing section 93. The white reference data is held in the RAM.

The white reference data is used as data for use in shading correction. Accordingly, the white reference data is to be set to a value in such a range that image data that has undergone shading correction is not saturated. For example, when a standard deviation of a noise component is 6 in a case where the reference white plate 90 is scanned at a resolution of 8 bits, a target value of the white reference data is set to 225 so that a result of scanning including a noise component falls within 256 gradations (8 bits), and tolerance is set as ±20% of this.

The controller 1101 determines whether the white reference data falls within a normal range (Step S205). When the white reference data is normal (YES at Step S205), the controller 1101 performs a process of switching off the exposure lamp 51 (Step S206), and the process to be performed at a time of returning from the power save mode ends.

On the other hand, when the white reference data is abnormal (NO at Step S205), the controller 1101 issues an instruction to move the first carriage 61 and the second carriage 62 to the respective areas corresponding to the reference white plate 90, and performs the gain control again (Step S207: corresponding to a gain-newly-setting unit). The controller 1101 then issues a homing instruction to move the first carriage 61 and the second carriage 62 to their home positions (Step S208).

Subsequently, the controller 1101 determines whether the white reference data falls within the normal range (Step S209: corresponding to a reexamining unit). When the white reference data is normal (YES at Step S209), the controller 1101 performs a process of switching off the exposure lamp 51 (Step S206), and the process to be performed at a time of returning from the power save mode ends. When the white reference data is abnormal (NO at Step S209), this means that white reference data does not fall within the normal range in spite of performing the gain control again, and therefore the controller 1101 determines that a fault occurs in the scanner section 200. In this case, the controller 1101 performs a process of switching off the exposure lamp 51 and stopping equipment (Step S210: corresponding to a stopping unit).

After performing the process of stopping equipment, the controller 1101 notifies a user about occurrence of abnormality by displaying it on a display of equipment, a user terminal, or the like (Step S211: corresponding to a notifying unit) and sends a notification to a service center (Step S212), for example.

Figure 7:
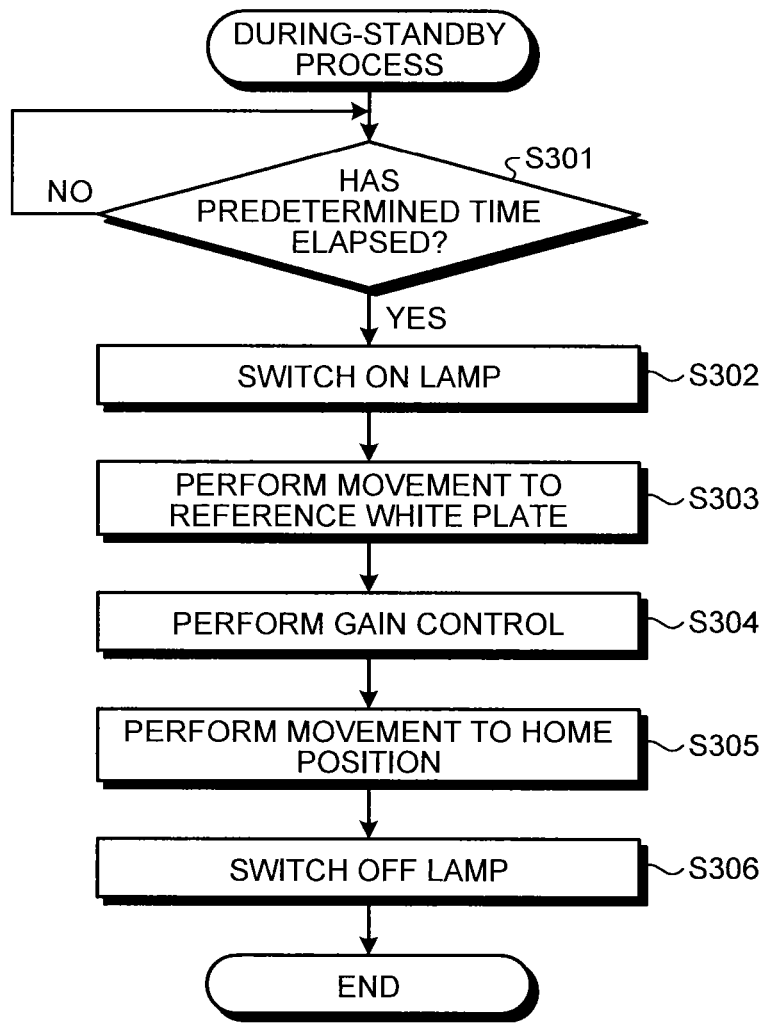
FIG. 7 is a flowchart of a maintenance process of the scanner section according to the first embodiment.

A procedure of a maintenance process is explained below. FIG. 7 is a flowchart of the maintenance process in the scanner section 200. When neither entry to the power save mode nor return from the power save mode is performed, the gain control is not performed and determination as to whether white reference data is normal is not performed. The maintenance process is performed to remedy such a situation. As illustrated in FIG. 7, the controller 1101 determines whether a predetermined period of time has elapsed since when the scanner section 200 has returned from the previous power save mode (Step S301). This determination as to lapse of the predetermined period of time may be made based on time that has elapsed or by determining whether number of scans performed by the scanner section 200 has exceeded a predetermined number.

The determination is repeatedly performed until the predetermined period of time elapses. When the predetermined period of time has elapsed (YES at Step S301), the controller 1101 performs a process of switching on the exposure lamp 51 (Step S302). The controller 1101 issues an instruction to move the first carriage 61 and the second carriage 62 to the respective areas corresponding to the reference white plate 90 (Step S303), and performs the gain control (Step S304). The controller 1101 then issues an homing instruction to move the first carriage 61 and the second carriage 62 to their home positions (Step S305). Finally, the controller 1101 performs a process of switching off the exposure lamp 51, and the maintenance process ends (Step S306).

The image forming apparatus according to the present embodiment described above utilizes the gain control values stored at a time of entering the power save mode. Accordingly, the gain control can be performed without the need of moving the first carriage and the second carriage to the respective areas corresponding to the reference white plate 90 at a time of returning from the power save mode, by which time necessary to perform this process can be eliminated. Therefore, further reduction in waiting time until it becomes possible to perform scan from being in the power-saving mode.

Furthermore, even when white reference data is detected to be abnormal at a time of returning from the power save mode, gain control is performed again, and, accordingly, equipment can operate if normal control is possible. This leads to reduction in apparatus downtime.

Furthermore, because abnormality detection of white reference data is performed at regular intervals by implementing the maintenance process, influence of abnormal white reference data on shading correction can be reduced.

Meanwhile, operations performed at Steps S209 to S211 can be omitted as appropriate. A configuration in which the maintenance process illustrated in FIG. 7 is omitted can be employed.

Second Embodiment

A second embodiment of the present invention is described below with reference to FIGS. 8 to 10. Note that the same components as those in the first embodiment are denoted by the same reference numerals and explanation thereabout is omitted.

Figure 8:
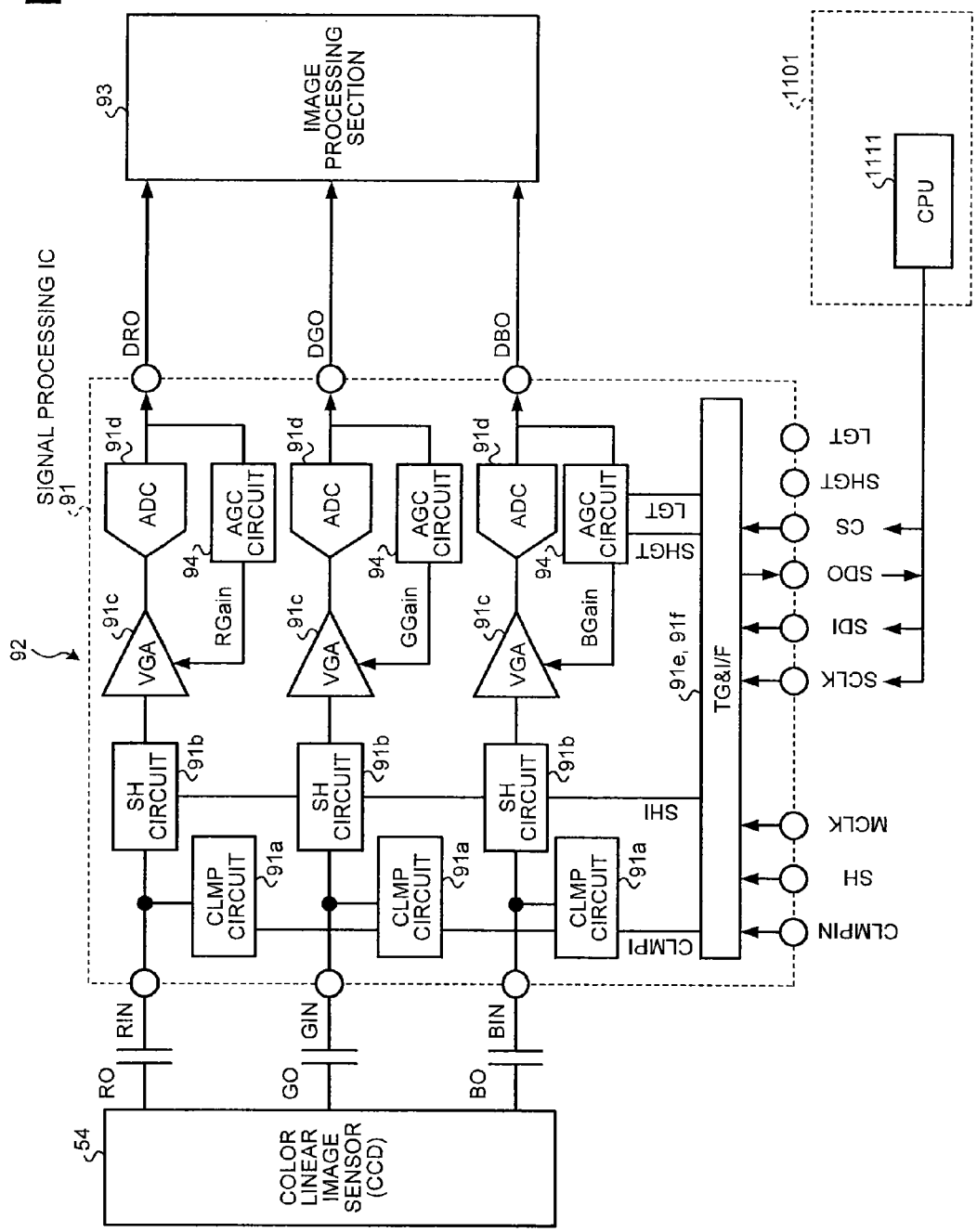
FIG. 8 is a block diagram illustrating a control system of the scanner section according to a second embodiment of the present invention.

FIG. 8 is a block diagram illustrating a control system of the scanner section 200. As illustrated in FIG. 8, in the present embodiment, the signal processing IC 91 includes AGC circuits 94 and can perform gain control using hardware.

Figure 9:
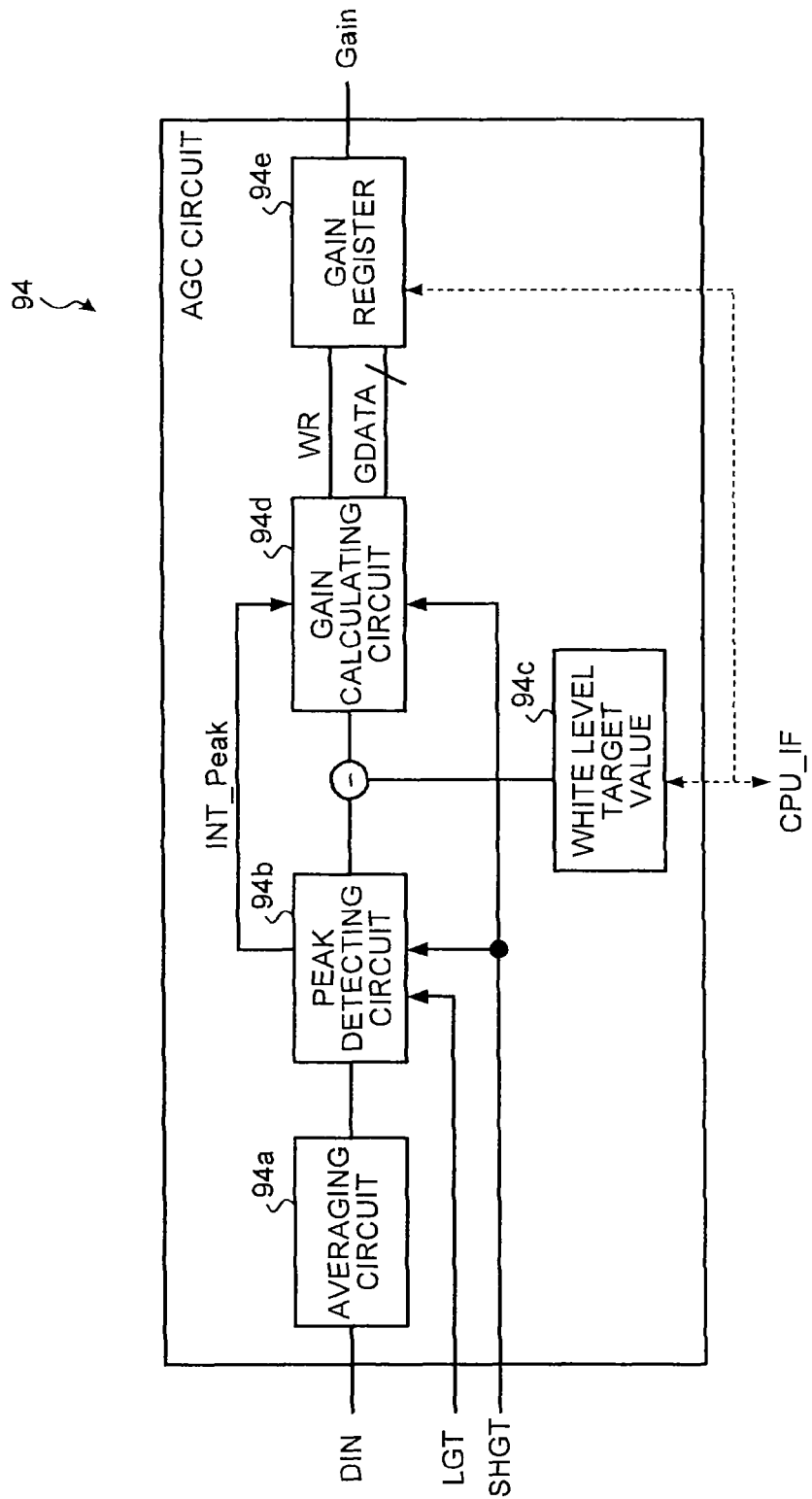
FIG. 9 is a block diagram illustrating a configuration of an AGC circuit according to the second embodiment.

FIG. 9 is a block diagram illustrating a configuration of the AGC circuit 94. The AGC circuit 94 starts performing AGC when an SHGT signal is asserted. An averaging circuit 94a of the AGC circuit 94 performs averaging of image data during a period when the SGTH signal is asserted. The image data from which noise is reduced by the averaging (e.g., moving averaging of data of four pixels) is then subjected to a peak detection in which a peak for each line is detected by a peak detecting circuit 94b. Peak detection data is latched when an LGT signal is negated. Peak data is thus determined. The thus-determined result of peak detection is input to a gain calculating circuit 94d that compares the result of peak detection with a predetermined white level target value 94c. When the result of peak detection goes out of tolerance of the target value, a gain is calculated, and the calculated gain is stored in a gain register 94e.

FIG. 10 is a timing diagram of a synchronization signal in the main-scanning direction and an effective area of scan data at a time of image scanning. Acquisition of the scan data for each line from the CCD image sensor 54 is performed in synchronization with the main-scanning synchronization signal LSYNC. A period corresponding to timing of the LGT signal in FIG. 10 is a period when CCD output is effective image data in the scan data of one line. FIG. 11 is a timing diagram in the sub-scanning direction. The SHGT signal indicates a period when the AGC is performed.

In the embodiments described above, an example is explained where an image forming apparatus to which the present invention is applied is a multifunction peripheral (MFP) that has at least two functions of a copier function, a printer function, a scanner function, and a facsimile function. However, the present invention is applicable to any image forming apparatus such as a copier, a printer, a scanner, or a facsimile.

According to an aspect of the present invention, waiting time until it becomes possible to perform scan from when being in the power save mode can be reduced while suppressing an increase in cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reader comprising:
   a gain amplifier;
   a reference white plate that is to be scanned when gain control of the gain amplifier is performed;
   a traveling member that moves to and stops at an area corresponding to the reference white plate at a time of entering a power save mode to save power consumption during standby;
   a gain storage unit that stores a gain control value after gain control as a return parameter at a time of entering the power save mode;
   a gain setting unit that sets the return parameter as a gain control value of the gain amplifier at a time of returning from the power save mode;
   an initializing unit that, after the gain setting unit has set the return parameter, performs a process of moving the traveling member from the area corresponding to the reference white plate to a home position of the traveling member, and simultaneously acquires a reference white level pertaining to the reference white plate and determines whether the reference white level falls within a normal range; and
   a gain-newly-setting unit that, when the reference white level is determined to fall outside the normal range, moves the traveling member to the area corresponding to the reference white plate and newly performs gain control of the gain amplifier.

2. The image reader according to claim 1, further comprising:
   a reexamining unit that, after the gain-newly-setting unit has newly performed gain control of the gain amplifier, acquires a renewed reference white level pertaining to the reference white plate and determines whether the renewed reference white level falls within the normal range; and
   a stopping unit that stops operation of equipment when the reexamining unit determines that the renewed reference white level falls outside the normal range.

3. The image reader according to claim 2, further comprising a notifying unit that provides a notification about occurrence of abnormality when the stopping unit stops operation of equipment.

4. The image reader according to claim 1, further comprising a maintenance unit that moves the traveling member to the area corresponding to the reference white plate and performs gain control of the gain amplifier when a predetermined period of time has elapsed.

5. An image forming apparatus comprising an image reader, wherein the image reader comprises:
   a gain amplifier;
   a reference white plate that is to be scanned when gain control of the gain amplifier is performed;
   a traveling member that moves to and stops at an area corresponding to the reference white plate at a time of entering a power save mode to save power consumption during standby;
   a gain storage unit that stores a gain control value after gain control as a return parameter at a time of entering the power save mode;
   a gain setting unit that sets the return parameter as a gain control value of the gain amplifier at a time of returning from the power save mode;
   an initializing unit that, after the gain setting unit has set the return parameter, performs a process of moving the traveling member from the area corresponding to the reference white plate to a home position of the traveling member, and simultaneously acquires a reference white level pertaining to the reference white plate and determines whether the reference white level falls within a normal range; and
   a gain-newly-setting unit that, when the reference white level is determined to fall outside the normal range, moves the traveling member to the area corresponding to the reference white plate and newly performs gain control of the gain amplifier.

* * * * *